United States Patent [19]
Kashiwaya et al.

[11] Patent Number: 4,495,802
[45] Date of Patent: Jan. 29, 1985

[54] AIR FLOW METER ASSEMBLY

[75] Inventors: Mineo Kashiwaya; Kinsaku Yamada, both of Katsuta, Japan

[73] Assignee: Hitachi, Ltd., Tokyo, Japan

[21] Appl. No.: 584,896

[22] Filed: Feb. 29, 1984

Related U.S. Application Data

[63] Continuation of Ser. No. 331,277, Dec. 16, 1981, abandoned.

[30] Foreign Application Priority Data

Dec. 22, 1980 [JP] Japan ................. 55-182272

[51] Int. Cl.$^3$ ............................................ G01N 15/00
[52] U.S. Cl. ......................................... 73/118; 73/204
[58] Field of Search ......................... 73/118, 202, 204

[56] References Cited
U.S. PATENT DOCUMENTS 4,264,961 4/1981 Nishimura et al. ............. 73/204
4,366,704 1/1983 Sato et al. ....................... 73/118

FOREIGN PATENT DOCUMENTS 106720  8/1979  Japan ................. 73/118
  5463  1/1980  Japan .
 37555  3/1980  Japan .
119925  9/1980  Japan .
2065898 7/1981  United Kingdom ........ 73/118

Primary Examiner—Jerry W. Myracle
Attorney, Agent, or Firm—Antonelli, Terry & Wands

[57] ABSTRACT

An air flow meter for detecting the air flow supplied to an internal combustion engine includes a hot-wire disposed in a by-pass air passage opening at its one end to a portion of an air passage upstream from a venturi portion formed in the air passage and at its other end in the venturi portion. The by-pass air passage is provided to lengthen a distance between the inlet opening of the by-pass passage and the hot-wire, to thereby settle the flow of air in the by-pass passage at least in the area around the hot-wire. The inlet opening of the by-pass air passage may open in a plane perpendicular to the axis of the venturi portion and within the area of upper projection of the venturi portion, to prevent carbon and oil particles from coming into the by-pass passage to thereby prevent the contamination of the hot-wire.

17 Claims, 4 Drawing Figures

AIR FLOW METER ASSEMBLY

This is a continuation of application Ser. No. 331,277 filed Dec. 16, 1981 now abandoned.

BACKGROUND OF THE INVENTION

The present invention relates to an air flow meter assembly and, more particularly, to a hot-wire air flow meter assembly suitable for use in a fuel supplying device for internal combustion engines.

Various types of air flow meters for internal combustion engines have been proposed and, for example, in Japanese Patent Laid Open application No. 55-37555 (Mar. 15, 1980), an air flow meter is proposed having a hot-wire disposed in a by-pass air passage provided in parallel with an air passage leading from an air cleaner and having a venturi portion and a throttle valve through which the air is supplied to the engine. An output signal from the hot-wire corresponds to the total air flow supplied to the engine through the air passage, and the output signal is delivered, for example, to a control unit for calculation of an optimum air-fuel ratio of the mixture. A fuel injector or a carburetor is controlled in accordance with the optimum air-fuel ratio calculated in the control unit, so that the mixture is fed to the engine at the optimized air-fuel ratio.

A prior-art air flow meter of the aforementioned type has a number of disadvantages. Namely, the air flowing into the air passage through the air cleaner generates vortexes to form complicated stream lines. This turbulence of the air adversely affects the air flowing through the by-pass air passage to cause a disturbance of the output signal from the hot-wire, resulting in an incorrect indication of the air flow.

Additionally, it is often experienced that contaminants such as carbon particles, oil particles and so forth come into the by-pass passage due to the phenomenon peculiar in engines such as back-firing. These contaminants undesirably attach to the surface of the hot-wire to deteriorate the sensitivity thereof.

SUMMARY OF THE INVENTION

Accordingly, the aim underlying the present invention essentially resides in providing an air flow meter assembly capable of precisely detecting the air flow, while eliminating the above-described disadvantages of the prior art.

Namely, an object of the invention is to provide an air flow meter assembly capable of correctly detecting the air flow without being disturbed by the turbulence of the air flowing into the air passage.

Another object of the invention is to provide an air flow meter assembly in which the contamination of the detecting means by the carbon and oil particles is avoided to ensure a correct measurement of the air flow.

To these ends, according to the invention, there is provided an air flow meter assembly comprising: an air passage having a venturi; a first by-pass air passage disposed in parallel with the air passage; and a detecting means disposed in the first by-pass air passage and adapted to generate an output signal corresponding to the air flow passing through the first by-pass air passage, with a cylindrical second air by-pass air passage being disposed at the upstream end opening of the first by-pass air passage and adapted to settle the flow of air in the first by-pass air passage.

According to the invention, a length of a portion of the by-pass air passage upstream from the hot wire is selected to be at least twice as large as a diameter of the first by-pass air passage.

According to further features of the invention, a cylindrical second by-pass air passage is provided at the upstream end opening of the first by-pass air passage within the area of upper projection of the venturi portion of the air passage, the second by-pass air passage opening along a plane normal to an axis of the venturi portion.

The above and other objects, as well as advantageous features of the invention will become clear from the following description of the preferred embodiments taken in conjunction with the acconpanying drawings.

DESCRIPTION OF THE PREFERRED EMBODIMENTS

Figure 1:
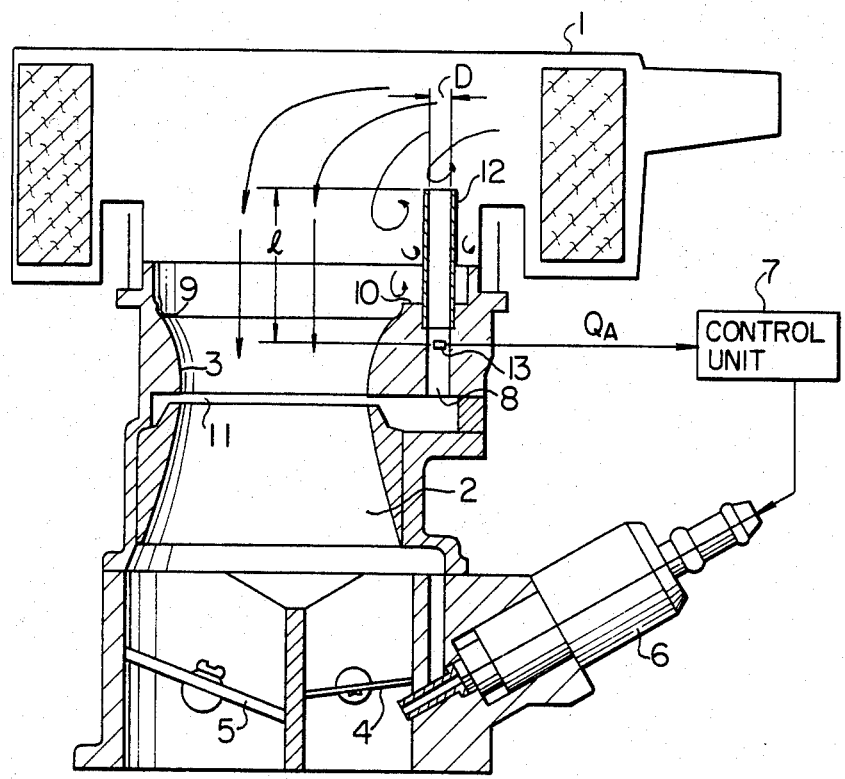
FIG. 1 is a cross-sectional view of a hot-wire air flow meter assembly constructed in accordance with the present invention.

Referring now to the drawings wherein like reference numerals are used throughout the various views to designate like parts and, more particularly, to FIG. 1, according to this figure, an air cleaner means 1 is disposed on an air passage 2 provided with a venturi portion 3 formed on the inner peripheral surface at a middle portion thereof, with valves 4, 5 and a fuel injector 6 being secured to the lower portion of the air passage 2. Air drawn in through the air cleaner means 1 flows through the venturi portion 3 of the air passage 2 and is mixed with the fuel injected by the injector 6 to form an air-fuel mixture which is fed into the cylinders of an internal combustion engine (not shown).

As is well known, the flow $Q_A$ of the air supplied to the engine is detected and the value of which is delivered to a control unit 7 which determines and sets the optimum air-fuel ratio (A/F) of the mixture supplied to the engine. The length of time of each injection from the injector 6 is determined in accordance with the determined optimum air-fuel ratio (A/F).

The throttle body including the air passage 2 having the venturi portion 3 is formed by, for example, a die-casting from aluminum, to have a first by-pass air passage 8 formed at a portion thereof near the venturi portion 3. The first by-pass air passage 8 has an inlet opening which opens to a land 10 formed at one portion of the air horn 9 on the top of the air passage 2 and an outlet opening communicated with an air passage 2 through a slit 11 formed in the throat portion of the venturi portion 3. A pipe or second by-pass air passage 12 made of, for example, a metallic material, is secured to the upper portion of the first by-pass air passage 8. A heat-sensitive resistor body, i.e. a hot wire 13, is disposed in the first by-pass air passage 8. The hot-wire 13 is adapted to change its electric resistance in accordance with the change in the flow of air flowing therearound.

Although not shown, the hot-wire 13 disposed in the first by-pass air passage, is usually composed of two hot-wire elements which constitute two of four sides of a Wheatstone bridge circuit.

The flow $Q_A$ of the air flowing in the air passage 2 of the throttle body is usually determined by the venturi portion 3, and the flow of the air in the first by-pass air passage 8 is changed in proportion to the change in the flow $Q_A$ in the air passage 2. The hot wire 13 which changes its resistance in response to the change in the flow $Q_A$ of air in the first by-pass passage 8, therefore, can generate an output signal proportional to the flow of air supplied to the engine.

In general, in the air flow meter assembly having a by-pass air passage 8 formed in parallell with an air passage 2, the air stream at the upstream portion of the by-pass air passage 8 tends to be disturbed by, for example, vortexes.

Various experiments having conducted to find out the following fact to achieve the present invention. Namely, the unfavorable influence of the turbulence of the air flow appearing in the upstream end portion of the by-pass air passage can be reduced to a negligibly small level by selecting the length l of the portion of the by-pass air passage upstream from the hot-wire 13 to be at least twice, preferably 5 to 10 times, as large as the diameter D of the by-pass air passage. On the other hand, the length of the by-pass air passage, particularly the length of the portion thereof upstream from the hot-wire, is limited by the size of the throttle body or the construction of the same. Therefore, it is extremely difficult to obtain the desired length of that portion of the by-pass air passage.

In the embodiment described above a metallic cylindrical pipe or second by-pass air passage 12 is attached to the upstream inlet portion of the by-pass air passage 8, in order to attain the desired length of the portion of the by-pass air passage upstream from the hot-wire. The pipe 12, however, may be formed from a material other than a metal and can have a cross-sectional shape other than circular. It is, however, desirable that the pipe 12 has an inner bore of a cross-section coinciding with the cross-section of the first by-pass air passage 8 and, preferably, that the cross-sectional area of the inner bore of the pipe 12 coincides with that of the first by-pass air passage 8, in order that the air flow in the by-pass air passage may not be disturbed.

Figure 2:
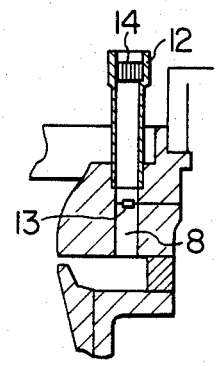
FIG. 2 is a cross-sectional view of a modification of a pipe incorporated in the hot-wire air flow meter assembly as shown in FIG. 1.

Referring to FIG. 2, a honey-comb-like flow settling grid 14 is provided at the upstream side end of the pipe 12 secured to the upstream inlet opening of the first by-pass air passage 8. This flow settling grid 14 effectively further settles the stream of air flowing in the by-pass air passage.

Figure 3A:
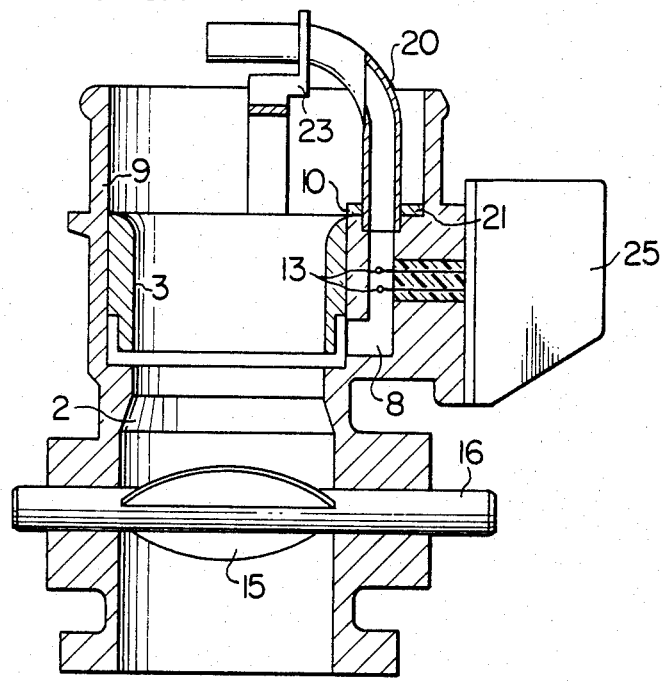
FIG. 3A is a cross-sectional view a hot-wire air flow meter assembly constructed in accordance with another embodiment of the present invention.
Figure 3B:
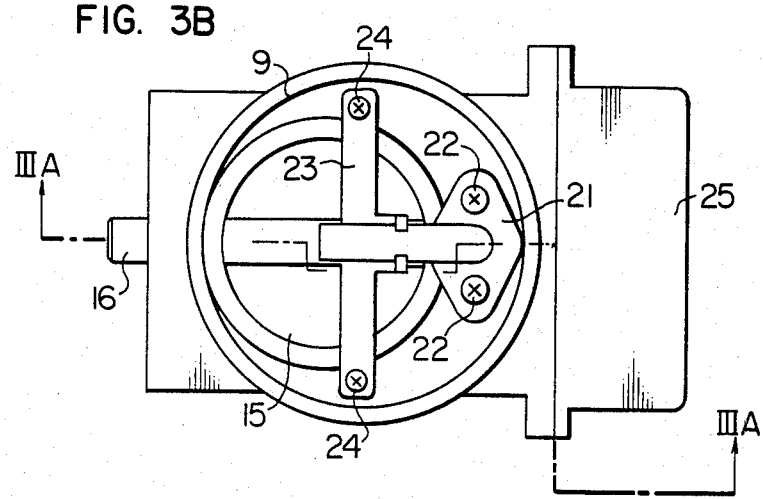
FIG. 3B is a top plan view of the hot-wire air flow meter assembly of FIG. 3A.

As shown in FIGS. 3A and 3B, a hot wire air flow meter assembly includes a throttle valve 15 mounted on a rotary shaft 16, disposed at the downstream side of the air passage 2, and acts to control the air flow supply to the engine (not shown). A fuel injector or a carburetor of the same type as that shown in FIG. 1 secured to the lower portion of the throttle body having the throttle valve 15.

As will be seen from FIGS. 3A, 3B, a pipe or second by-pass air passage 20, bent at a predetermined curvature, is attached to the upstream inlet portion of the first by-pass air passage 8. The pipe 20 is made of, for example, a metal, and has a flange member 21 attached thereto by means of welding or the like. The pipe 20 is firmly fixed to the land 10 of the throttle body by means of screws 22. Furthermore, a supporting member 23 of, for example, a metal, is secured to the same land portion by means of screws 24 to support the bent pipe 20.

As will be seen from FIGS. 3A, 3B, the bent pipe 20 has an inlet opening in an area of the upper projection of the venturi portion 3 and is disposed in a plane substantially perpendicular to the axis of the venturi portion 3.

In still another embodiment, the inlet opening of the pipe 20 opens on a straight line substantially perpendicular to the axis of the venturi portion 3.

Due to the bending of the pipe 20, carbon and oil particles having comparatively large inertia can hardly be introduced into the pipe 20, while the air having comparatively small inertia is allowed to easily come into the pipe 20. Consequently, the attaching of carbon and oil particles to the hot-wire 13, attributable to the back-fire and other phenomenon, can fairly be avoided to ensure a correct measuring of the air flow. The change in the resistance of the hot-wire 13 is detected by a detecting means 25 and is sent to the control unit (not shown).

According to the invention, it is possible to stabilize the flow of air in the by-pass air passage, particularly in the region around the hot-wire to achieve a stable heat transfer between the hot-wire and the air flowing therearound, so that the air flow can be detected at a high precision. Additionally, it is possible to eliminate unfavorable effects of carbon and oil particles on the measurement of the air flow.

What is claimed is:

1. An air flow meter assembly for internal combustion engines, the air flow meter assembly comprising:
   an air cleaner means for intaking air supplied to said engine;
   throttle valve means for controlling the air flow to be supplied to said engine;
   an air passage extending between said air cleaner means and said throttle valve means and having a venturi portion;
   a bypass air passage means for bypassing an air flow around the venturi portion including a first by-pass air passage, a first end of said by-pass air passage having an inlet opening disposed at a portion of said air passage at a position upstream of said venturi portion, a second end of said first by-pass air passage opening into said venturi portion, and means for forming a second by-pass air passage and having a first end attached to the first end of said first by-pass passage;
   means disposed in said first by-pass air passage for detecting the air flow through said by-pass air passage means; and
   wherein said second by-pass air passage has a predetermined length such that a second end of said second by-pass passage is spaced from said means for detecting the air flow such that the air flowing into the by-pass air passage means is settled prior to the air flow reaching said means for detecting the air flow, and said second end of said second by-pass passage projects into said air passage.

2. An air flow meter assembly as claimed in claim 1, wherein said means for forming said second by-pass passage is a cylindrical member, the distance between an inlet opening of the first end of said second by-pass passage and said means for detecting the air flow is at least twice as large as a diameter of said by-pass air passage means.

3. An air flow meter assembly as claimed in claim 1 wherein said first end of said first by-pass air passage terminates in a land provided on said air passage.

4. An air flow meter assembly as claimed in claim 1, wherein said first by-pass air passage and said second by-pass air passage have identical cross-sections.

5. An air flow meter assembly as claimed in claim 1, wherein an inlet opening of said second by-pass air passage is disposed within an area of an upper projection of said venturi portion and is disposed in a plane substantially parallel to a longitudinal venturi portion.

6. An air flow meter assembly as claimed in claim 5, wherein said first by-pass air passage has a substantially L-shaped form.

7. An air flow meter assembly as claimed in claim 1, wherein an inlet opening of said second by-pass air passage opens in a plane substantially perpendicular to a longitudinal axis of said venturi portion.

8. An air flow meter assembly as claimed in claim 1, wherein said means for detecting air flow inluces a hot wire.

9. An air flow meter assembly as claimed in claim 1, wherein means for settling the flow of air are disposed in said second by-pass air passage.

10. An air flow meter assembly as claimed in claim 1, wherein said first by-pass air passage extends substantially in parallel with said air passage.

11. An air flow meter assembly as claimed in claim 1, wherein the distance between an inlet opening of said first end of said second by-pass air passage and said means for detecting the air flow is between 5-10 times as large as a diameter of the by-pass air passage means.

12. An air flow meter assembly for an internal combustion engine, the air flow meter assembly comprising intake means for supplying air to the engine, throttle valve means for controlling the air supplied to the engine, an air passage extending between said intake means and said throttle valve means, a venturi means arranged in said air passage, a by-pass means for by-passing the air flow around the venturi means, said by-pass means including a first end having an inlet opening disposed at a portion of the air passage at a position upstream of said venturi means and a second end opening into the air passage at a position downstream of said venturi means, means disposed in the by-pass means for detecting the air flow through the by-pass means, and means mounted on the first end of said by-pass means and projecting into said air passage for reducing a turbulence of the air flow at the first end of said by-pass means such that the air flow through the by-pass means is settled prior to reaching said means for detecting the air flow.

13. An air flow meter assembly according to claim 12, wherein said means for reducing a turbulence includes a hollow cylindrical member mounted to the first end of said by-pass means, said cylindrical member having a predetermined length such that a distance between a second end of the cylindrical member and said means for detecting the air flow is between 5-10 times a diameter of the by-pass passage means.

14. An air flow meter assembly according to claim 13, wherein said means for reducing a turbulence further includes an air flow settling means mounted in said cylindrical member.

15. An air flow meter assembly according to claim 13, wheein the second end of said cylindrical member is disposed in a plane substantially parallel to a longitudinal axis of said venturi means.

16. An air flow meter assembly for internal combustion engines, the air flow meter assembly comprising:
   an air cleaner means for intaking air supplied to said engine;
   a throttle valve means for controlling the air flow to be supplied to said engine;
   an air passage extending between said air cleaner means and said throttle valve means and having a venturi portion;
   a by-pass air passage means for by-passing an air flow around the venturi portion including a first by-pass air passage, a first end of said first by-pass air passage having an inlet opening disposed at a portion of said air passage at a position upstream of said venturi portion, a second end of said first by-pass air passage opening into said venturi portion, and means for forming a second by-pass air passage and having a first end communicating with the first end of the first by-pass passage;
   means disposed in said first by-pass air passage for detecting the air flow through said by-pass air passage means; and
   wherein said second by-pass air passage has a predetermined length so as to project into said air passage with a second end of said second by-pass passage being spaced from said means for detecting the air flow such that the air flowing into the by-pass air passage means is settled prior to the air flow reaching said means for detecting the air flow.

17. An air flow meter assembly for internal combustion engines, the air flow meter assembly comprising:
   an air cleaner means for intaking air supplied to said engine;
   throttle valve means for controlling the air flow to be supplied to said engine;
   an air passage extending between said air cleaner means and said throttle valve means and having a venturi portion;
   a by-pass air passage means for by-passing an air flow around the venturi portion, a first end of said by-pass air passage having an inlet opening disposed at a portion of said air passage at a position upstream from said venturi portion, a second end of said first by-pass air passage opening into said venturi portion, means for forming a second by-pass air passage and having a first end attached to the first end of said first by-pass passage;
   means disposed in said first by-pass air passage for detecting the air flow through said by-pass air passage means; and
   wherein said second by-pass air passage has a predetermined length so as to project into said air passage with a second end of the second by-pass passage being spaced from means for detecting the air flow such that the air flowing into the by-pass air passage means is settled prior to the air flow reaching the means for detecting the air flow, and said second end of said second by-pass passage extends into a projected plane of said venturi portion.

* * * * *